US009365149B2

(12) United States Patent
Nowak

(10) Patent No.: US 9,365,149 B2
(45) Date of Patent: Jun. 14, 2016

(54) WIRELESSLY OPERATED HYDRAULIC TAIL GATE SYSTEM

(71) Applicant: Dieter Nowak, Winchester, TN (US)

(72) Inventor: Dieter Nowak, Winchester, TN (US)

( * ) Notice: Subject to any disclaimer, the term of this patent is extended or adjusted under 35 U.S.C. 154(b) by 13 days.

(21) Appl. No.: 14/550,882

(22) Filed: Nov. 21, 2014

(65) Prior Publication Data
US 2015/0147145 A1 May 28, 2015

Related U.S. Application Data

(60) Provisional application No. 61/963,091, filed on Nov. 22, 2013.

(51) Int. Cl.
*B60P 1/44* (2006.01)
(52) U.S. Cl.
CPC ............. *B60P 1/4471* (2013.01); *B60P 1/4421* (2013.01)
(58) Field of Classification Search
CPC .................... B60P 1/4471; B60P 1/4421
See application file for complete search history.

(56) References Cited

U.S. PATENT DOCUMENTS

| | | | | |
|---|---|---|---|---|
| 2,706,565 A * | 4/1955 | Krasno | ................ | B60P 1/4421 414/545 |
| 2,949,197 A * | 8/1960 | Lomen | ................ | B60P 1/4421 414/545 |
| 4,763,487 A * | 8/1988 | Wicks | ................ | B60P 3/20 414/558 |
| 4,780,044 A * | 10/1988 | Elskamp | ................ | B60P 1/4414 414/557 |
| 5,110,251 A * | 5/1992 | Gray | ................ | B60P 1/4471 187/242 |
| 7,299,897 B2 * | 11/2007 | Stockmann | ............ | B60P 1/4471 187/274 |
| 7,573,221 B2 * | 8/2009 | Rock | .................... | B60P 1/4471 318/283 |
| 7,798,761 B2 * | 9/2010 | Goodrich | ............... | A61G 3/061 318/468 |
| 8,198,981 B2 * | 6/2012 | Ablabutyan | .......... | B60P 1/4471 318/466 |
| 8,234,046 B2 * | 7/2012 | Ablabutyan | .......... | B60P 1/4471 414/495 |
| 2005/0058528 A1 * | 3/2005 | Wroblewski | .......... | B60P 1/4435 414/545 |
| 2009/0072570 A1 * | 3/2009 | Savoy | ................... | B60P 1/4471 296/56 |
| 2010/0241320 A1 * | 9/2010 | Lugash | ................. | B60P 1/4471 701/49 |
| 2011/0072811 A1 * | 3/2011 | Bark | ..................... | B60P 1/4471 60/459 |
| 2013/0189062 A1 * | 7/2013 | Bark | ..................... | B60P 1/4471 414/557 |

FOREIGN PATENT DOCUMENTS

| | | | | |
|---|---|---|---|---|
| BE | 1009370 A6 * | 2/1997 | ............ | B60P 1/4464 |
| DE | 102008028434 A1 * | 12/2009 | ............ | B60P 1/4471 |
| DE | EP 2392492 A1 * | 12/2011 | ............ | B60P 1/4471 |

* cited by examiner

*Primary Examiner* — Kaitlin Joerger

(57) ABSTRACT

A truck having a truck body with lift track and a battery electrically connected to the body and a platform for moving along the lift track. A box holding a hydraulic unit with solenoid valves for moving the platform is attached to the truck body. A movable wireless switch having an internal power source is on the platform. When a user operates a switch the movable wireless switch emits a movement signal from a movable antenna electrically connected to the truck body. A fixed wireless switch is on the truck body. When a user operates a switch the fixed wireless switch emits a movement signal from an antenna electrically connected to the body. A wireless receiver receives the movement signal and then applies control signals to the hydraulic unit. The wireless receiver also receives a sensor signal and emits an alert if the hydraulic unit has a problem.

17 Claims, 6 Drawing Sheets

WIRELESSLY OPERATED HYDRAULIC TAIL GATE SYSTEM

CROSS-REFERENCE TO RELATED APPLICATION

This application claims the benefit of U.S. Provisional Application No. 61/963,091, filed on Nov. 22, 2013.

FIELD OF THE INVENTION

The presently disclosed subject matter is directed to hydraulic tail gates. More particularly, it is directed to wireless hydraulic tail gates.

BACKGROUND OF THE INVENTION

One of the most difficult problems when making deliveries with a truck is loading and unloading the truck. Some locations have loading docks at the same height as the truck bed to facilitate loading and unloading. Such locations support fast loading, stacking and unloading of cargo being carried on the truck by using pallet jacks, lift trucks and other cargo handling equipment.

Properly configured loading docks are highly useful and efficient. But not all locations have such docks. Almost all local deliveries and cargo pickups are performed at ground level. This leaves a gap of several feet from moving cargo from the truck bed to ground or from the ground to the truck bed. In some particular applications it has been found useful to simply carry a lift truck on the back of the cargo truck to assist loading and unloading cargo. Unfortunately this involves a significant amount of money, difficulty in using the lift truck, difficulty in carrying the lift truck so that is can be rapidly positioned at ground level, and it can be dangerous. Furthermore such an approach is useless at some locations where the ground is less than ideal or in operations not suitable for carried lift trucks.

One solution to the problem of loading and unloading cargo onto and from trucks is the use of hydraulically powered tail gates (also referred to as lift gates). Such tail gates are platforms that are attached to the back of the truck and which can hydraulically raise or lower a load to and from ground onto and from the truck bed. Tail gates have proven themselves as highly valuable devices that greatly ease the difficulty of loading and unloading trucks.

While tail gates are widely used they are not without problems. One serious problem with prior art tail gates is that they require wired electrical switches to operate and control the hydraulic pump unit that actually moves the tail gate. For convenience at least some of those wires and electrical switches are located proximate the tail gate itself. Given the rugged conditions that exist in moving cargo it is not surprising that damage to the wiring or electrical switches is very common. Such damage can be costly and time consuming to repair while resulting in some cargo not being loaded or unloaded until the damage is fixed.

In view of the problems with prior art hydraulic tail gates a hydraulic tail gate system having increased reliability would be beneficial. Beneficially such a hydraulic tail gate system would enable simplification of the electrical system required for its operation. In practice such a hydraulic tail gate system would be particularly useful if it eliminated the need for expensive high current switches and wires. Preferably such a hydraulic tail gate system could be incorporation into new trucks or implemented as a retrofit kit for existing hydraulic tail gates. Such a hydraulic tail gate system would be even better if it implemented a sensor system for checking system status and failure diagnostics.

BRIEF SUMMARY OF THE INVENTION

The principles of the present invention provide for wirelessly operated truck hydraulic tail gate systems having increased reliability and which can simplify the electrical wiring of a hydraulic tail gate by eliminating wires, switches, and possibly relays. The wirelessly operated hydraulic truck tail gate system enables replacement of high current switches and wires with lower current switches and wires. The wirelessly operated truck hydraulic tail gate system is suitable for incorporation into new vehicles or as a retrofit kit for existing hydraulic tail gates.

A truck in accord with the present invention includes a truck body having a truck power source in electrical communication with said truck body. The truck further includes a vertical lift track attached to the truck body, a movable platform for moving along the lift track, a box attached to the truck body and a hydraulic system having a hydraulic unit within the box with the hydraulic unit including internal solenoid valves that operate in accord with control signals. A movable wireless switch is attached to the platform. The movable wireless switch includes a movable switch power source that powers both a movable switch controller and a movable switch RF transmitter having a movable antenna. The movable wireless switch further includes a user-accessible movable switch that is operatively connected to the movable switch controller. When the movable switch is switched the movable switch controller causes the movable switch RF transmitter to emit a movement signal from the movable antenna. In addition, the truck includes a fixed wireless switch on said body and having a fixed switch power source that powers both a fixed switch controller and a fixed switch RF transmitter having a fixed antenna. The fixed wireless switch includes a user-accessible fixed switch that is operatively that is connected to the fixed switch controller. When the fixed switch is switched the fixed switch controller causes the fixed switch RF transmitter to emit a movement signal from the fixed antenna. In addition, the truck also includes a wireless receiver powered by the truck power source. The wireless receiver having a receiver controller operatively connected to a receiver having a receiver antenna. When the receiver antenna receives a movement signal the receiver applies the movement signal to the receiver controller which decodes the movement signal and applies decoded switching signals as the control signals.

Beneficially, the movable antenna and/or the fixed antenna are operatively connected to the truck body. The box may include relays and the control signals are then applied to the relays. Alternatively the control signals are applied to the hydraulic unit. In practice the truck power source is a battery which may be in the box. The movement signal may cause the platform to rise or fold up. Preferably the movable switch is at least a three position switch and the fixed switch is at least a three position switch. Usefully the movable antenna is bolted to the truck body. In addition there may be at least one sensor that is operatively connected to the receiver controller wherein the at least one sensor provides the receiver controller with an operating condition of the hydraulic system. If so, the truck may then further include alert, typically an audio alarm, is operatively connected to the receiver controller to provide an alarm when the operating condition is faulty.

A hydraulic lift that is in accord with the present invention includes a metallic truck body; a lift track attached to the truck body, a metallic platform for moving along the lift track and which is electrically connected to the truck body. Also included are a metallic box attached to the truck body, a truck power source within the box, and a hydraulic system that includes a hydraulic unit within the box. That hydraulic unit includes solenoid valves that operate in accord with control signals. A movable switch device is attached to the platform. The movable switch device has a movable power source that powers both a movable controller and a movable RF transmitter having a movable antenna which attached to the metallic platform. The movable switch device further includes a user-accessible movable switch that is operatively connected to the movable controller. When the movable switch is switched the movable controller causes the movable RF transmitter to emit a movement signal from the movable antenna. Also included is a fixed switch device on said the truck body. The fixed switch device has a fixed switch power source that powers both a fixed controller and a fixed RF transmitter having a fixed antenna that is electrically connected to the truck body. The fixed switch device further includes a user-accessible fixed switch that is operatively connected to the fixed controller. When the fixed switch is switched the fixed controller causes the fixed RF transmitter to emit a movement signal from the fixed antenna. Also included is a receiver device powered by the truck power source. The receiver device has a receiver controller operatively connected to a receiver having a receiver antenna. When the receiver antenna receives a movement signal the receiver applies the movement signal to the receiver controller which decodes the movement signal and applies decoded switching signals as control signals.

In practice the box may include relays and wherein the control signals are applied to the relays. Alternatively, the control signals may be are applied to the hydraulic unit. The movement signal causes the platform to lower or it may cause the platform to unfold.

BRIEF DESCRIPTION OF THE DRAWINGS

The advantages and features of the present invention will become better understood with reference to the following detailed description and claims when taken in conjunction with the accompanying drawings in which like elements are identified with like symbols and in which:

DETAILED DESCRIPTION OF THE INVENTION

Figure 1:
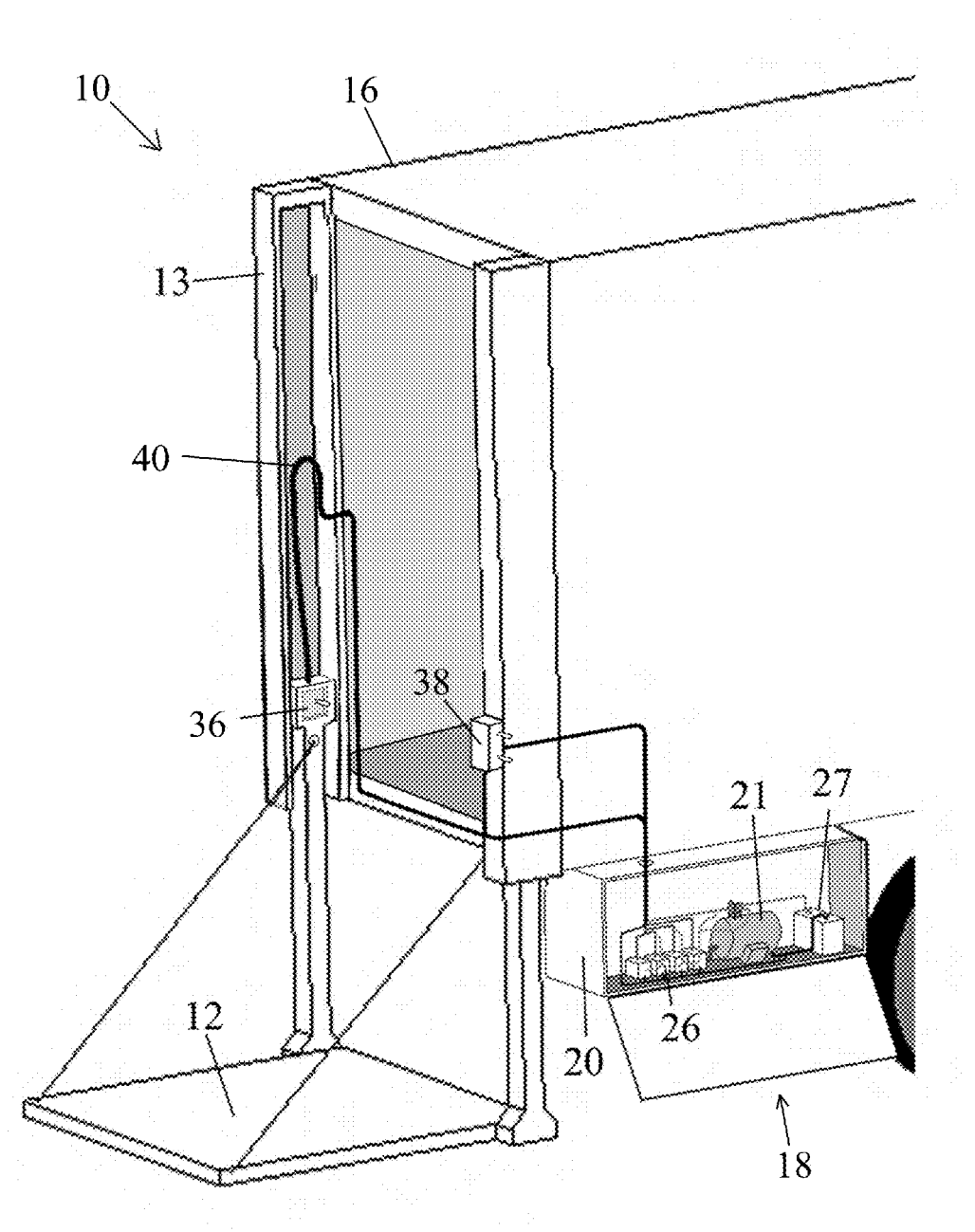
FIG. 1 illustrates a typical prior art hydraulic tail gate system 10.

The present invention is depicted in FIGS. 2 through 7 while FIG. 1 illustrates a prior art system which is useful for illustrating how the present invention differs from the prior art. However, the invention is not limited to the specifically described and illustrated embodiments. A person skilled in the art will appreciate that many other embodiments of the invention are possible without deviating from the basic concept of the invention. Any such work around will also fall under the scope of this invention.

The terms "a" and "an" as used herein do not denote a limitation of quantity, but rather denote the presence of at least one of the referenced items. In addition, unless otherwise denoted all directional signals such as in, out, up, down, left, and right are taken with reference to FIG. 1.

FIG. 1 illustrates a typical prior art tail gate system 10. The tail gate system 10 includes a vertically movable metal platform 12 that is mounted on lift tracks 13 at the rear of a truck 16. The platform 12 can be folded down, folded up, raised or lowered along the tracks 13 by power provided by a hydraulic pump unit 18. The hydraulic pump unit 18 typically is housed in a metal box 20 that is mounted to the side of the truck 16.

The hydraulic pump unit 18 is a typical hydraulic pump unit that includes a hydraulic unit 21 having an internal electric motor, a hydraulic pump, and solenoid valves. As the electric motor turns it operates the hydraulic pump. Meanwhile, electric relays 26 selectively energize the solenoid valves using electric power from a battery 27. In operation the hydraulic unit 21 pressurizes a hydraulic system through the actions of its solenoid valves. This pressurizes one or more hydraulic cylinders (not shown) which raises, lowers, folds up, and folds down the platform 12. As the operation of the hydraulic pump unit 18 is well known in the art a more detailed description is not required for the understanding of the present invention.

However, it should be understood that "hard-wired" electrical circuitry operates the relays 26 in the rather complex pattern required to operate the solenoid valves within the hydraulic unit 21 to develop the hydraulic pressures. In the prior art tail gate system 10 the relays 26 are activated by manually operated switches. Typically there are at least two sets of electric switches, one is a movable switch set 36 and the other is a fixed switch set 38. The movable switch set 36 is attached to the platform 12 and moves up and down with that platform 12. This enables operation of the platform by a person standing on the platform 12. The fixed switch set 38 is attached to the frame of the truck 16. The fixed switch set 38 enables operation by a person standing beside the truck 16. In the tail gate system 10 the movable switch set 36 and the fixed switch set 38 are connected to the relays 26 by an electrical wiring harness 40.

As noted the relays 26 control the solenoid valves within the hydraulic unit 21. The relays 26 operate whenever the movable switch set 36 or the fixed switch set 38 is activated. Also as noted rather complex circuitry associated with the relays 26 act as a hard wired program to produce the appropriate sequence of solenoid valve actuations. Since the movable switch set 36 and the fixed switch set 38 initiate the operations of the relays 12 a break in the electrical wiring harness 40 prevents proper operation of the hydraulic unit 21.

Still referring to FIG. 1, the electrical wiring harness 40 is typically folded into a 180 degree loop within the tracks 13. This enables vertical motion of the movable switch set 36 and the platform 12 while the electrical wiring harness 40 remains attached to the movable switch set 36. This results in repeated bending and flexing of the wires making up the electrical wiring harness 40 as the platform is moved. Such bending and flexing induces breaks in the wires of the electrical wiring harness 40 which can render the hydraulic pump unit 18 inoperable. In prior art the flexing of the wire harness 40 when the tail gate is in motion causes constant wear on the harness and leads rapidly to failure.

Compounding the wear problems with the wire harness 40 is that due to the complexity of the wiring required for proper switch actions the wire harness 40 becomes a thick set of wires that must be installed into the interior of the chassis. This makes the wire harness 40 expensive to manufacture, expensive to install, prone to failure, and expensive to repair.

Figure 2:
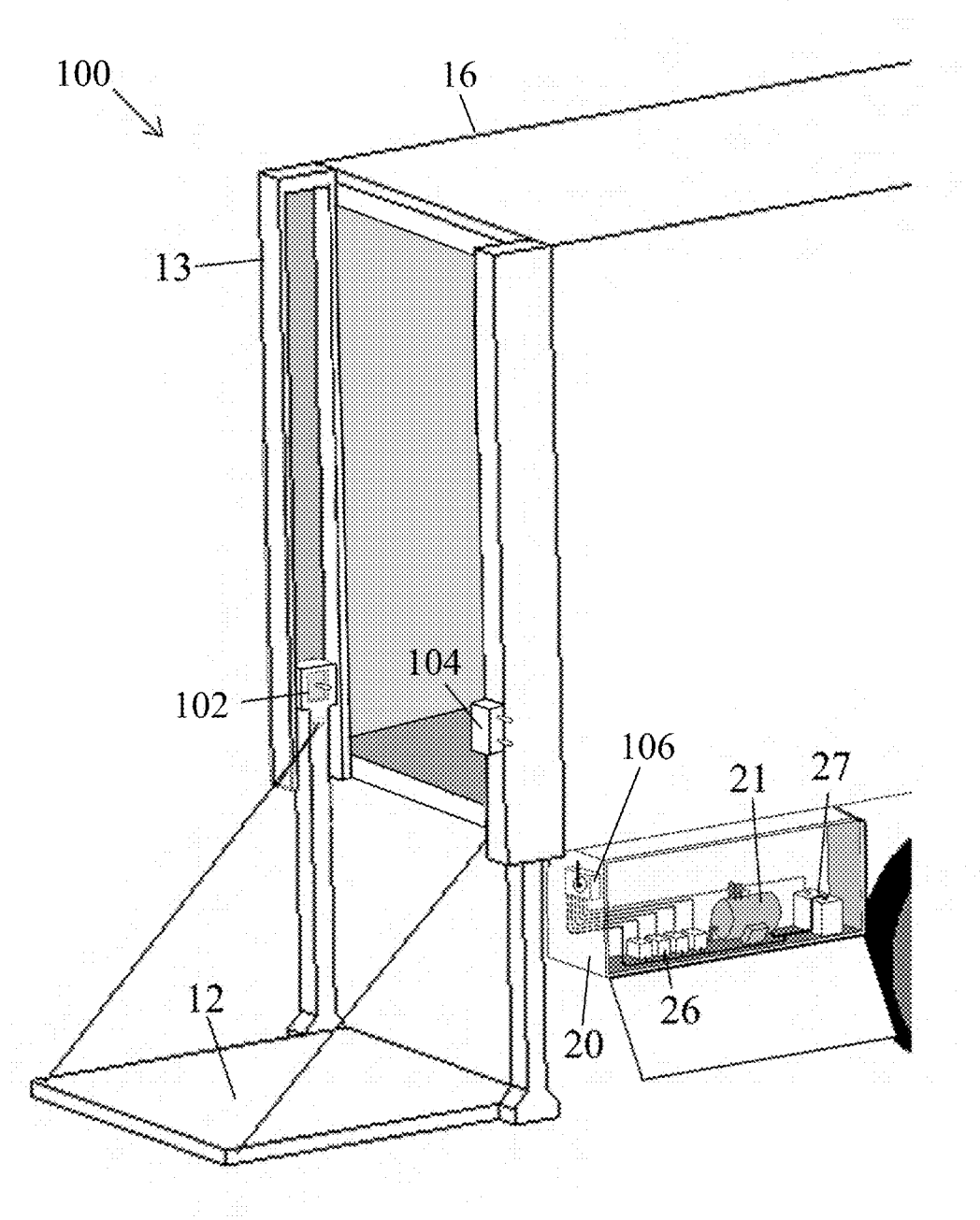
FIG. 2 illustrates a hydraulic tail gate system 100 that is in accord with the principles of the present invention.

Refer now to FIG. 2. To address the problems associated with the electrical wiring harness 40 the present invention provides for a hydraulic tail gate system 100 without a wiring harness 40. Rather than incorporate a wiring harness 40 the hydraulic tail gate system 100 respectively replaces the movable switch set 36 and the fixed switch set 38 with a movable wireless switch set 102 and a fixed wireless switch set 104 that communicate with a wireless receiver 106 in a hydraulic assembly 105. The hydraulic assembly 105 includes the hydraulic unit 21 and the battery 27 as described above. In one embodiment (shown in FIGS. 2 and 6) the hydraulic assembly 105 also includes relays 26 while in another embodiment (shown in FIG. 7) the hydraulic assembly 105 has no relays 26.

By ordinary means a wireless signal would not successfully connect wireless switches to a wireless receiver configured as in FIG. 2. This is because the metal confines of the truck 16 would block wireless signals. As described in more detail subsequently, to overcome that problem the movable wireless switch set 102 and the fixed wireless switch set 104 use the truck 16 chassis as an antenna.

Figure 5:
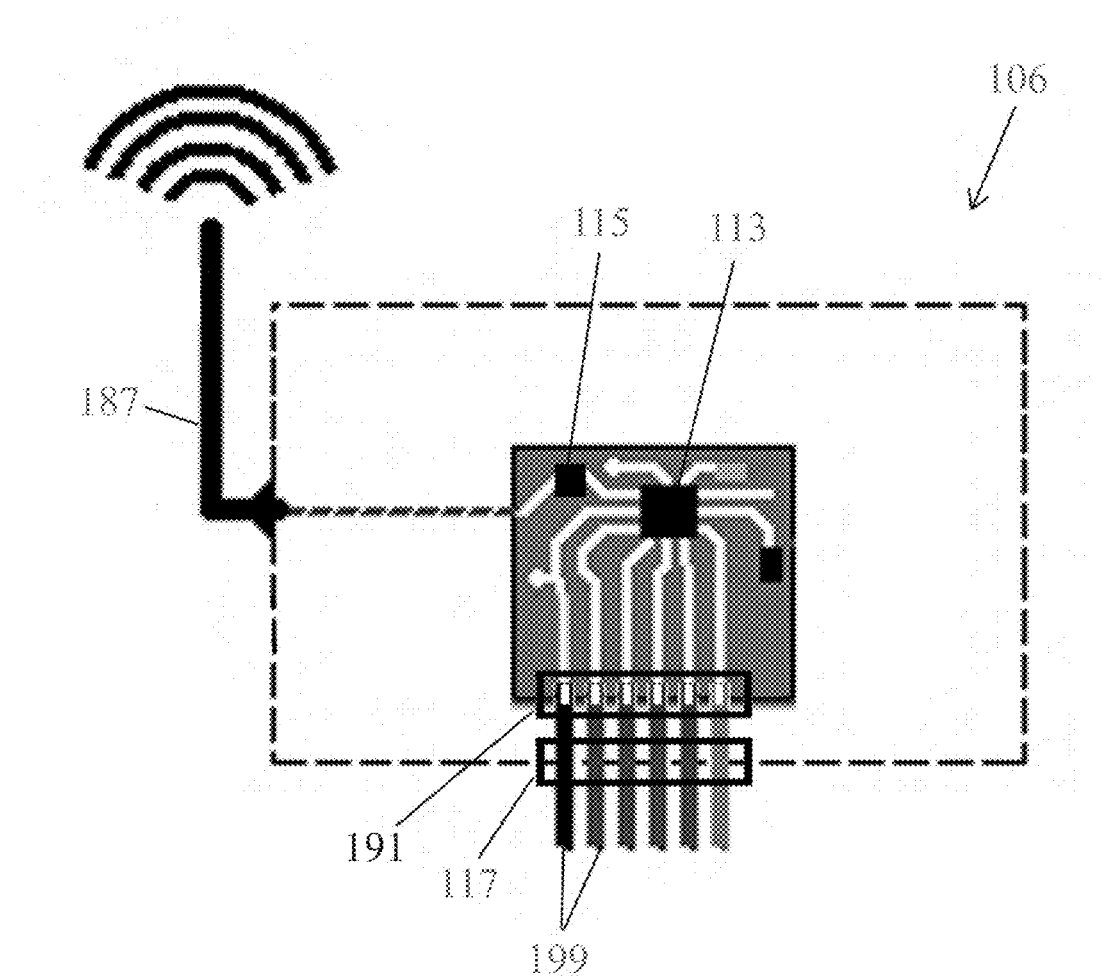
FIG. 5 is a schematic depiction of a hydraulic control system 106 of the hydraulic tail gate system 100 illustrated in FIG. 2.

The movable wireless switch set 102 and the fixed wireless switch set 104 transmit encrypted movement signals by radio frequency (RF) to the wireless receiver 106. The wireless receiver 106 is powered by the battery 27 which is connected through bus 117 with wires 199. Turning to FIG. 5, the wireless receiver 106 includes a microcontroller 113 (see FIG. 6) that decodes the encrypted movement signals received by a receiver 115 via its antenna 187. The microcontroller 113 then outputs operating electrical signals on a bus 117. In the embodiment shown in FIGS. 2 and 6 the operating electrical signals on the bus 117 are applied to the relays 26. The relays 26 then selectively energize the solenoid valves of the hydraulic unit 21 using electric power from the battery 27 to initiate the production of hydraulic pressure. In the embodiment shown in FIG. 7 the operating electrical signals on the bus 117 are directly applied to the solenoid valves. The prior art "hardwired" program of operation being replaced by software programming of the operating electrical signals.

Figure 6:
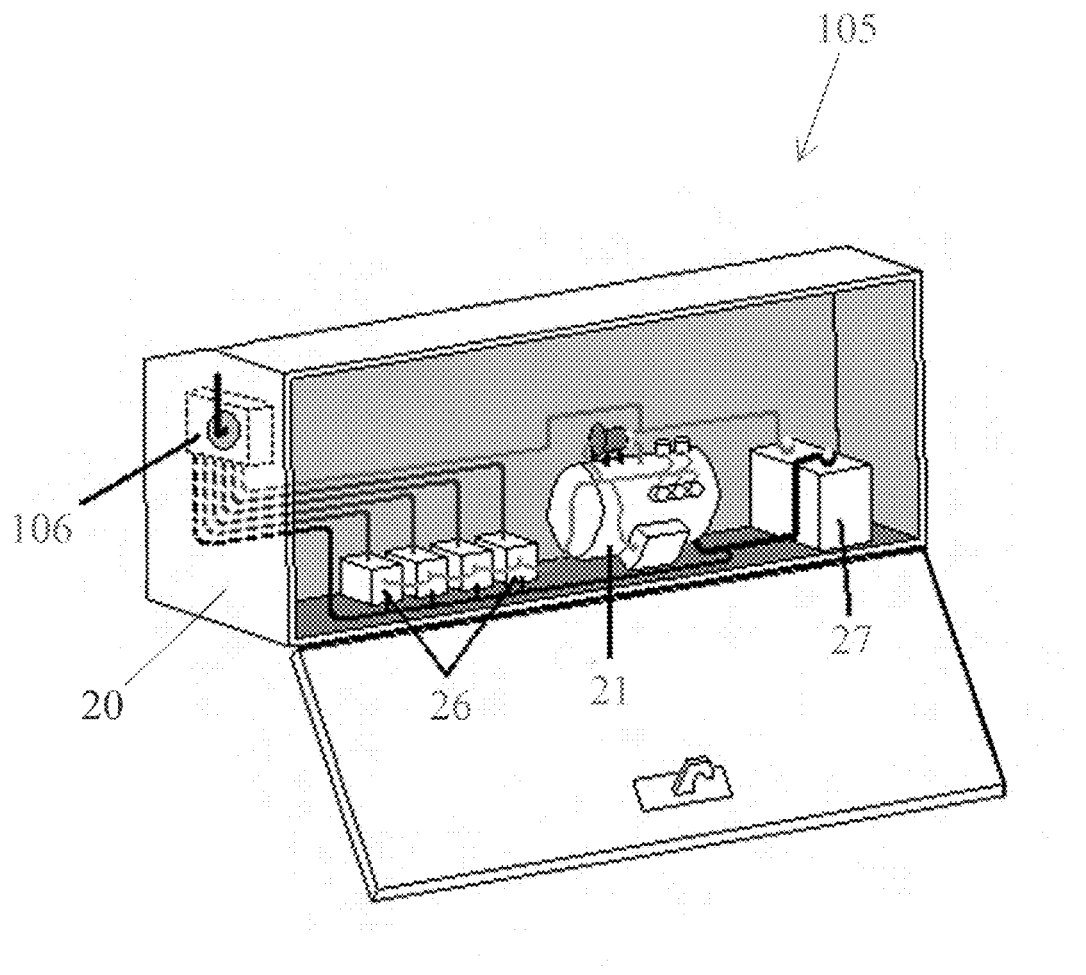
FIG. 6 is a depiction of one approach to operating a hydraulic pump so as to benefit from the hydraulic tail gate system 100.
Figure 7:
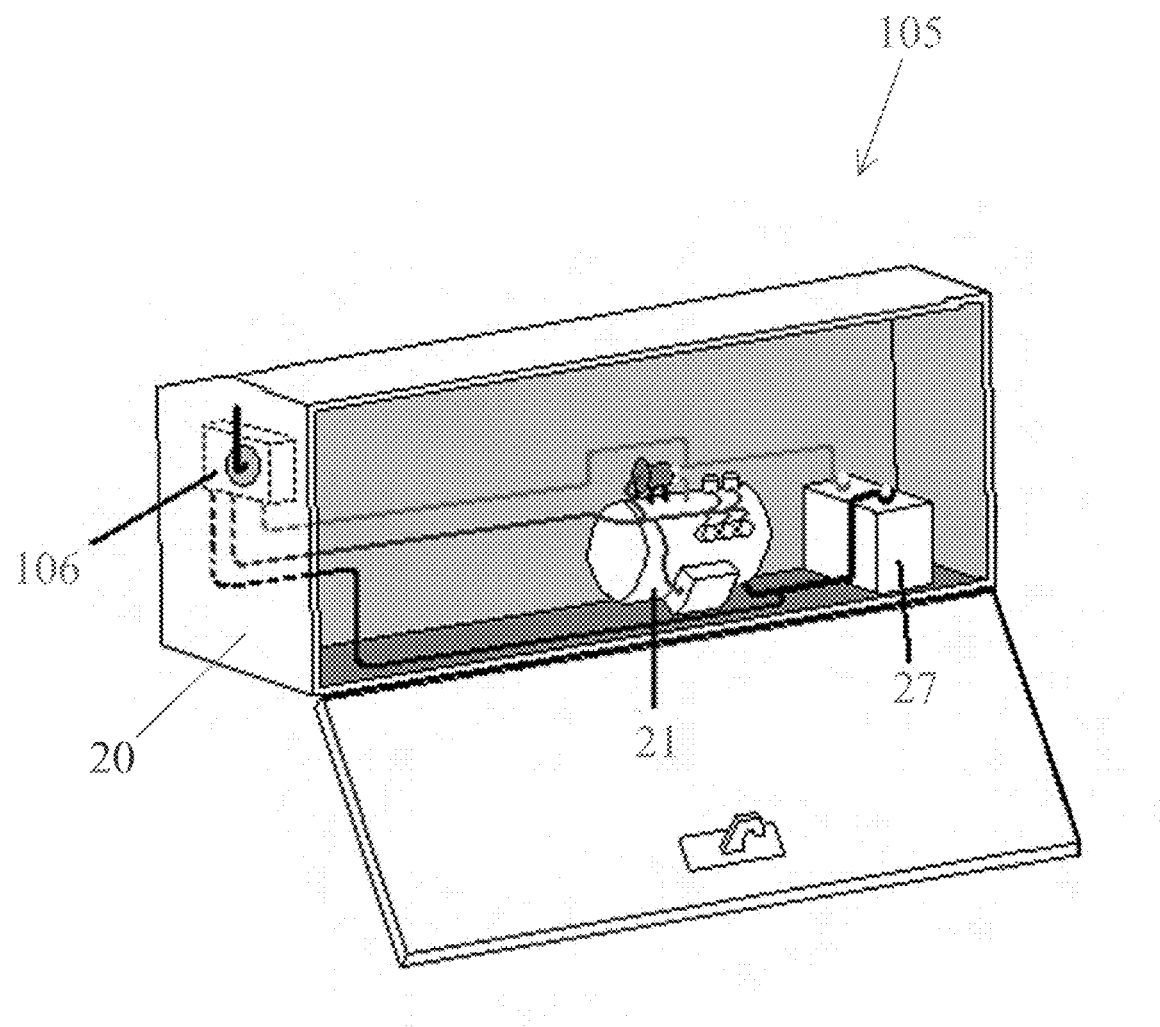
FIG. 7 is a depiction of another approach to operating a hydraulic pump so as to benefit from the hydraulic tail gate system 100.

The embodiment shown in FIGS. 2 and 6 mimics the signals that would have existed on the replaced electrical wiring harness 40. This leaves the prior art system of relays 26 intact. This approach is highly beneficial for retrofitting the present invention into existing hydraulic tail gates. The embodiment shown in FIG. 7 directly activates the solenoid valves. This eliminates the relays 26 and the complex hardwired programming they implement. This approach is well suited for use on new trucks 16 and is highly beneficial in reducing cost and improving reliability by eliminating the relays 26 while also simplifying changes to solenoid valve operations.

The wireless receiver 106 may be attached outside the box 20 or for protection against physical damage inside the box 20. If mounted inside the box 20 either the box 20 will include a non-metallic section that allows radio reception or an external antenna 111 (see FIG. 5).

Figure 3:
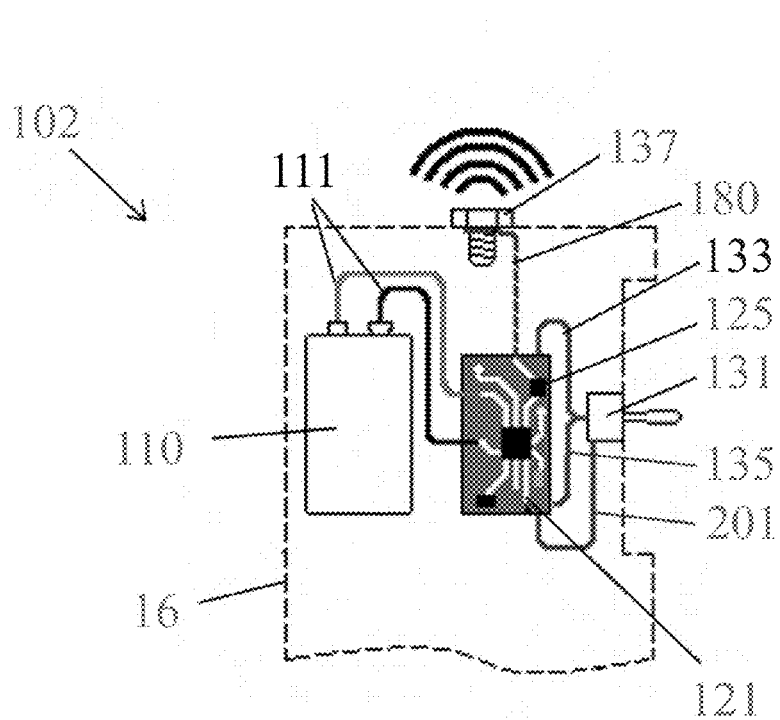
FIG. 3 is a schematic depiction of a movable tail gate switch 102 of the hydraulic tail gate system 100 illustrated in FIG. 2.

Turning now to FIG. 3, the movable wireless switch set 102 includes an internal power source 110 such as a battery or a super capacitor or battery super capacitor hybrid charged in some manner such as with a solar panel (not shown). The internal power source 110 supplies electrical power to a microcontroller board 121 via wires 111. The microcontroller board 121 includes an on-board microcontroller. The movable wireless switch set 102 also includes a transmitter 125 (or transceiver) having an antenna 180. The transmitter 125 may be part of the microcontroller board 121. The microcontroller board 121 receives inputs from a user accessible three (3) position toggle switch 131. The switch antenna 180 is specially designed to integrate with the metal frame of the truck 16. This connection is facilitated by a bolt 137 that connects the antenna 180 to the truck 16. This enables the wireless communication system to overcome the Faraday cage effect of the vehicle frame which would otherwise block the signals.

When a user operates the switch 131 to cause the platform 12 to raise, a first switch input 133 goes HIGH. The microcontroller on the microcontroller board 121 senses this state and causes the transmitter 125 to send an encoded "raise" movement signal to the wireless receiver 106. When a user operates the switch 131 to cause the platform 12 to lower a second switch input 135 goes HIGH. The microcontroller on the microcontroller board 121 senses this state and causes the transmitter 125 to send an encoded "lower" movement signal to the wireless receiver 106. When no motion is needed switch 131 is left in its "OFF" state and all inputs to the microcontroller board 121 are LOW and the transmitter 125 is controlled to not send anything. The HIGH signal is achieved by way of a wire 201 applied to the switch by the microcontroller board 121. The microcontroller board does not draw power when in the "off position." This greatly extends the life of the power source 110.

Figure 4:
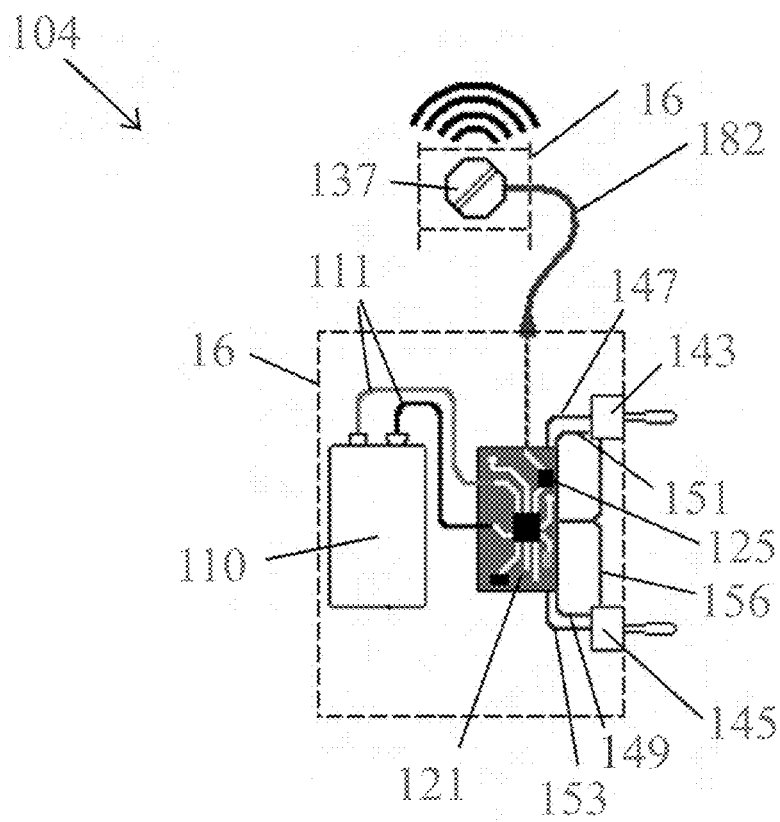
FIG. 4 is a schematic depiction of a fixed tail gate switch 104 of the hydraulic tail gate system 100 illustrated in FIG. 2.

Turning now to FIG. 4, the fixed wireless switch set 104 also includes an internal power source 110 which supplies electrical power via wires 111 to a microcontroller board 121 with an on-board microcontroller. The fixed wireless switch set 104 also includes a transmitter 125 (or transceiver) having an antenna 182 connected to the frame of the truck 16. This connection is facilitated by a bolt 137 that connects the antenna to the frame of the truck 16. The nature of this antenna configuration enables wireless communications in a manner that overcomes the Faraday cage effect of the truck frame which would otherwise block signals. The microcontroller board 121 receives four (4) inputs from two different user accessible three position toggle switches 143 and 145.

When a user operates the switch 143 to cause the platform 12 to raise a first switch input 147 goes HIGH. The microcontroller on the microcontroller board 121 senses this state and causes the transmitter 125 to send an encoded "raise" movement signal to the wireless receiver 106. When a user operates the switch 145 to cause the platform 12 to lower a second switch input 149 goes HIGH. The microcontroller on the microcontroller board 121 senses this state and causes the transmitter 125 to send an encoded "lower" movement signal to the wireless receiver 106. When a user operates the switch 143 to fold the platform 12 up a third switch input 151 goes HIGH. The microcontroller on the microcontroller board 121 senses this state and causes the transmitter 125 to send an encoded "fold" movement signal to the wireless receiver 106. When a user operates the switch 145 to unfold the platform 12 a fourth switch input 153 goes HIGH. The microcontroller on the microcontroller board 121 senses this state and causes the transmitter 125 to send an encoded "unfold" movement signal to the wireless receiver 106. When no motion is needed all inputs to the microcontroller board 121 are LOW and the transmitter 125 is controlled to send anything. Switching power for the switches 143 and 145 are supplied by the microcontroller board 121 via wires 156. The microcontroller board does not draw power when in the "off position." This greatly extends the life of the power source 110.

Turning to FIG. 5, in response to encoded movement signals from either the movable wireless switch set 102 or the fixed switch set 104 the receiver 115 of the wireless receiver 106 receives the encoded movement signal and causes its microcontroller 113 to take appropriate action to cause the appropriate sequence of operation of the hydraulic valves to cause the of the hydraulic assembly 105 to raise, lower, fold, or unfold the platform 12.

The respective antennas 180 and 182 of the movable wireless switch set 102 and the fixed wireless switch set 104 are both attached to the frame of the truck 16 as shown in FIGS. 3 and 4. This enables a reliable, low-power RF signal to communicate with the wireless receiver 106. This is possible because the electric power of the movable wireless switch set 102 and the fixed wireless switch set 104 produced by the internal power source 110 are isolated from the electrical system of the truck 16. By attaching the antennas 180 and 182 to the frame of the truck 16 the truck itself becomes the antenna, broadcasting a reliable signal from the movable wireless switch set 102 and the fixed wireless switch set 104 to the antenna 187 of the wireless receiver 106. Thus the movable wireless switch set 102 and the fixed wireless switch set 104 can be covered and thus protected in the metal frame of the truck 16 which would otherwise function as a Faraday cage that would trap the RF signal thereby making communications with the wireless receiver 106 in the box 20 impossible.

The wireless receiver 106 is in or on the box 20, gets its power from the vehicle electric system via the battery 27, it therefore is not isolated from the vehicle electric system. Therefore the antenna 187 of the wireless receiver 106 is a regular antenna which for reliability is preferably mounted outside the box 20 or at least runs through the box 20.

As previously discussed the microcontroller 113 generates appropriate signals either for the relays 26 or for the solenoid valves of the hydraulic pump 21. In addition, the microcontroller 113 has additional inputs which are used for monitoring a sensor system 191 that senses operating parameters of the hydraulic pump 21 via wires 199 and a connector 117. Operating parameters may include the conductivity of the solenoid coils, the voltage of the battery 27, operating current, hydraulic pressures or the RF signal strengths from the movable wireless switch set 102 and from the fixed wireless switch set 104. The outputs of the sensor system 191 are analyzed in real time to determine the status of the system. Should a problem be found the microcontroller 113 operates an internal alarm to warn of an existing or pending problem. An alarm code can be used to identify the problem. For example, short audio burst may signal a defective solenoid while a set of one (1) second long audio bursts might signal loss of hydraulic pressure. Other patterns would then signal other issues.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed:

1. A truck, comprising;
   a truck body having a truck power source in electrical communication with said truck body;
   a vertical lift track attached to said truck body;
   a movable platform for moving along said lift track;
   a box attached to said truck body;
   a hydraulic system having a hydraulic unit within said box, said hydraulic unit having internal solenoid valves that operate in accord with control signals;
   a movable wireless switch attached to said platform, said movable wireless switch having a movable switch power source that powers both a movable switch controller and a movable switch RF transmitter having a movable antenna operatively connected to said truck body so as to use said truck body as an antenna, said movable wireless switch further including a user-accessible movable switch operatively connected to said movable switch controller, wherein when said movable switch is switched said movable switch controller causes said movable switch RF transmitter to emit a movement signal from said truck body;
   a fixed wireless switch on said truck body, said fixed wireless switch having a fixed switch power source that powers both a fixed switch controller and a fixed switch RF transmitter having a fixed antenna electrically connected to said truck body so as to use said truck body as an antenna, said fixed wireless switch further including a user-accessible fixed switch operatively connected to said fixed switch controller, wherein when said fixed switch is switched said fixed switch controller causes said fixed switch RF transmitter to emit a movement signal from said truck body;
   a wireless receiver powered by said truck power source, said wireless receiver having a receiver controller operatively connected to a receiver having a receiver antenna; wherein when said receiver antenna receives a movement signal said receiver applies said movement signal to said receiver controller which decodes said movement signal and applies decoded switching signals as said control signals.

2. The truck according to claim 1, wherein said box further includes relays and wherein said control signals are applied to said relays.

3. The truck according to claim 1, wherein said control signals are applied to said hydraulic unit.

4. The truck according to claim 1, wherein said truck power source is a battery.

5. The truck according to claim 4, wherein said battery is in said box.

6. The truck according to claim 1, wherein said movement signal causes said platform to rise.

7. The truck according to claim 1, wherein said movement signal causes said platform to fold up.

8. The truck according to claim 1, wherein said movable switch is at least a three position switch.

9. The truck according to claim 8, wherein said fixed switch is at least a three position switch.

10. The truck according to claim 1, further including at least one sensor operatively connected to said receiver controller, wherein said at least one sensor provides said receiver controller with an operating condition of said hydraulic system.

11. The truck according to claim 10, further including an alert operatively connected to said receiver controller, wherein said alert provides an alarm when said operating condition is faulty.

12. The truck according to claim 11, wherein said alert is an audio alarm.

13. A hydraulic lift, comprising;
a metallic truck body;
a lift track attached to said truck body;
a metallic platform for moving along said lift track, said platform electrically connected to said truck body;
a metallic box attached to said truck body;
a truck power source within said box and in electrical communication with said truck body;
a hydraulic system including a hydraulic unit within said box, said hydraulic unit having solenoid valves that operate in accord with control signals;
a movable switch device attached to said platform, said movable switch device having a movable power source that powers both a movable controller and a movable RF transmitter having a movable antenna that is electrically connected to said metallic platform, said movable switch device further including a user-accessible movable switch operatively connected to said movable controller, wherein when said movable switch is switched said movable controller causes said movable RF transmitter to emit a movement signal from said truck body;
a fixed switch device on said truck body, said fixed switch device having a fixed switch power source that powers both a fixed controller and a fixed RF transmitter having a fixed antenna that is electrically connected to said truck body, said fixed switch device further including a user-accessible fixed switch operatively connected to said fixed controller, wherein when said fixed switch is switched said fixed controller causes said fixed RF transmitter to emit a movement signal from said truck body;
a receiver device powered by said truck power source, said receiver device having a receiver controller operatively connected to a receiver having a receiver antenna; wherein when said receiver antenna receives a movement signal said receiver applies said movement signal to said receiver controller which decodes said movement signal and applies decoded switching signals as said control signals.

14. The hydraulic lift according to claim 13, wherein said box further includes relays and wherein said control signals are applied to said relays.

15. The hydraulic lift according to claim 13, wherein said control signals are applied to said hydraulic unit.

16. The hydraulic lift according to claim 13, wherein said movement signal causes said platform to lower.

17. The hydraulic lift according to claim 13, wherein said movement signal causes said platform to unfold.

* * * * *